(12) United States Patent
Wheeler, Jr. et al.

(10) Patent No.: US 6,763,812 B2
(45) Date of Patent: Jul. 20, 2004

(54) CENTRIFUGAL AIR COMPRESSOR

(75) Inventors: Floyd James Wheeler, Jr., Northridge, CA (US); Floyd James Wheeler, III, Laano, CA (US)

(73) Assignee: Wheelerco Products, Inc. DBA Powerdyne Automotive Products, Lancaster, CA (US)

(*) Notice: Subject to any disclaimer, the term of this patent is extended or adjusted under 35 U.S.C. 154(b) by 0 days.

(21) Appl. No.: 10/445,651

(22) Filed: May 27, 2003

(65) Prior Publication Data

US 2003/0192515 A1 Oct. 16, 2003

Related U.S. Application Data

(62) Division of application No. 10/054,111, filed on Nov. 13, 2001, now abandoned, which is a continuation of application No. 09/273,365, filed on Mar. 22, 1999, now Pat. No. 6,390,942, which is a division of application No. 08/425,821, filed on Apr. 20, 1995, now Pat. No. 5,887,576.

(51) Int. Cl.$^7$ ............................................. F02B 33/00
(52) U.S. Cl. ................................................. 123/559.1
(58) Field of Search ..................... 123/559.1; 474/205; 415/170.1, 229

(56) References Cited

U.S. PATENT DOCUMENTS

| | | | |
|---|---|---|---|
| 2,741,234 A | 4/1956 | Wiseman | |
| 2,913,932 A | 11/1959 | Oehrli | |
| 3,264,653 A | * 8/1966 | Lebkuchner | 415/106 |
| 3,506,374 A | * 4/1970 | Kaebich | 415/225 |
| 3,664,758 A | * 5/1972 | Ryuichi | 415/104 |
| 4,041,789 A | * 8/1977 | Hoback | 474/205 |
| 4,108,506 A | 8/1978 | Osborn | |
| 4,173,376 A | 11/1979 | Standing et al. | |
| 4,626,232 A | * 12/1986 | Witt | 474/205 |
| 4,775,357 A | 10/1988 | Wolfe | |
| 4,998,524 A | 3/1991 | Black et al. | |
| 5,071,316 A | * 12/1991 | Diem et al. | 415/168.1 |
| 5,224,459 A | 7/1993 | Middlebrook | |
| 5,228,786 A | 7/1993 | Tanimoto et al. | |
| D339,142 S | 9/1993 | Middlebrook | |
| 5,417,617 A | 5/1995 | Milton | |
| 5,887,576 A | 3/1999 | Wheeler, Jr. et al. | |
| 6,390,942 B2 | * 5/2002 | Wheeler, Jr. et al. | 474/205 |

OTHER PUBLICATIONS

"Powerdyne Blower" article by Tom Wilson in 5/94 Super Ford magazine.

* cited by examiner

*Primary Examiner*—Michael Koczo
(74) *Attorney, Agent, or Firm*—Jon Hokanson, Esq.; Brian Drazich, Esq.; Coudert Brothers LLP

(57) ABSTRACT

A centrifugal supercharger is disclosed that includes an internal drive mechanism which embodies the present invention. A pair of sprockets are connected to parallel input and output drive shafts and drivingly connected by a taut, high tension, endless cog-belt seated and running on the two sprockets. A plurality of belt stabilizing components are incorporated therein to provide maintenance-free, low-temperature operation of the drive mechanism. These stabilizing components include air ducts formed in the output sprocket, tensioning members formed in the belt, heat-resistant and high-speed ceramic ball bearings and shock absorbing springs that alone and in combination provide a highly efficient drive mechanism.

1 Claim, 4 Drawing Sheets

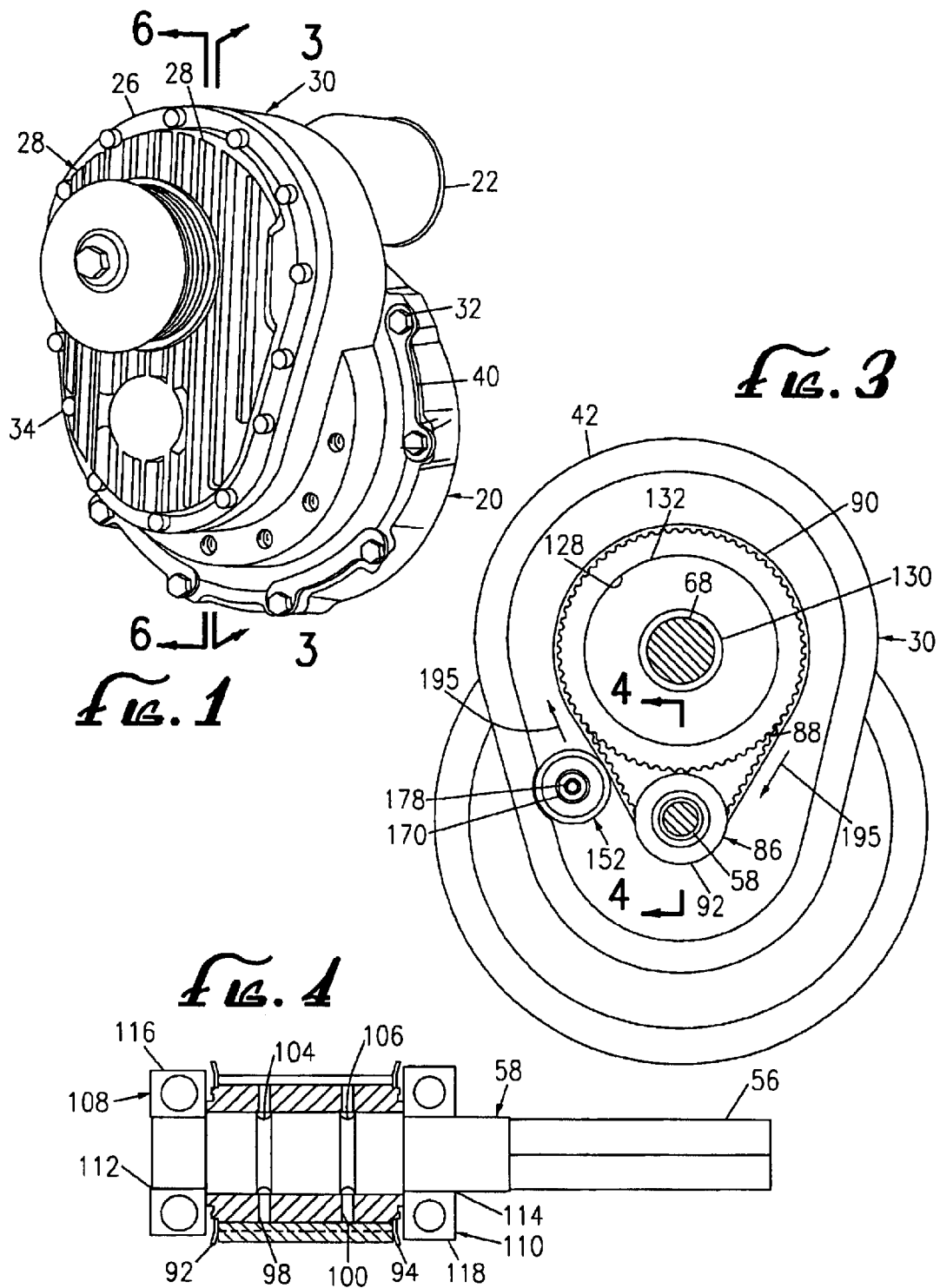

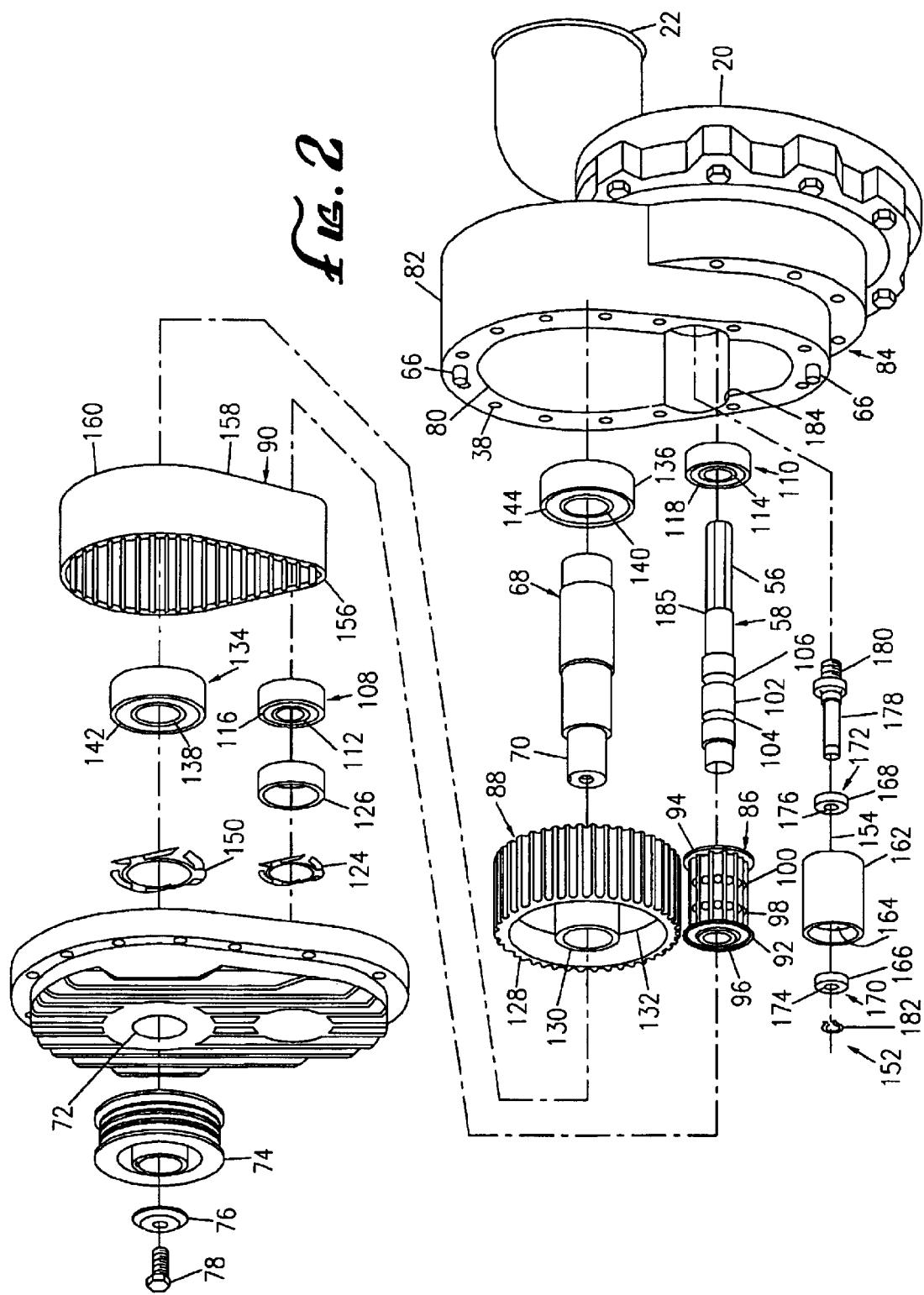

CENTRIFUGAL AIR COMPRESSOR

This is a divisional of application Ser. No. 10/054,111, filed Nov. 13, 2001, now abandoned, which was a continuation of application Ser. No. 09/273,365, filed Mar. 22, 1999, now U.S. Pat. No. 6,390,942, issued May 21, 2002, which was a divisional of application Ser. No. 08/425,821, filed Apr. 20, 1995, now U.S. Pat. No. 5,887,576, issued Mar. 30, 1999.

BACKGROUND OF THE INVENTION

A. Field of the Invention

The present invention relates broadly to an internal drive mechanism in an air compressor and, more specifically, to a drive mechanism for use in a supercharger for an internal combustion engine or an air compressor of the type driven mechanically by the engine or other power source.

B. Discussion of the Prior Art

It is well known that in a supercharger or air compressor, increasing the volume of air charge delivered to the combustion chamber of an internal combustion engine will increase the output of the engine for a given displacement at a given engine speed. There are two basic types of superchargers, centrifugal and positive displacement. The centrifugal type is very efficient, providing the best ratio between unit dimensions and flow volume. The air compression in the centrifugal design is achieved using a scroll or scroll-shaped air chamber having a centrally located air inlet and an impeller rotatably disposed in the air inlet to draw in air and then the compress the air within the scroll. An air outlet connected to the combustion chamber delivers the compressed air to the engine. Centrifugal designs require high peripheral compressor-wheel or impeller velocities approaching or exceeding the speed of sound, which can be achieved with either an exhaust-driven direct-drive turbine compressor wheel combination, or a mechanical drive connected between the engine crankshaft and the input shaft of the supercharger. The overall speed ratio between the impeller and the crankshaft should be, practically, at least nine impeller rotations for every rotation of the crankshaft, and the outer external mechanical drive is usually limited to a step-up ratio of approximately three input shaft rotations for every rotation of the crankshaft. Thus a further internal step-up mechanism is desired to increase the impeller to three or four additional rotations for every rotation of the input shaft.

It is known in air compressors that a step-up ratio of 9 to 1 between power sources and the impeller is desirable. Presently this ratio has been attempted using external step-up drives only; however, such configurations result in relatively low speeds and low flow when compared to an air compressor with an internal step-up drive. Internal drives have in the past not been considered reliable for this intended use.

Previously known internal drive mechanisms have employed planetary traction drives, or gear drives. An example of an internal gear drive mechanism is disclosed in U.S. Pat. No. 5,224,459, issued to James Middlebrook. In general, traction drives or gear drives require lubrication, causing unwanted heat buildup, which thereby tends to reduce the density of the compressed air discharge. Planetary step-up ball and/or race drives require preloading of the mechanism to prevent slippage, due to the necessity of lubrication and traction to transmit rotational power. The preloading of these drives and the related lubrication causes further intrinsic heat buildup, thus further reducing the density of the compressed air discharge. Gear drives are undesirably noisy to operate, usually requiring hot engine oil to lubricate the gears and bearings, causing additional heat buildup, which also contributes to a reduction of the air density. In addition, the gear drives must be connected to the engine oil reserve, making them more difficult to install and maintain.

OBJECTS AND SUMMARY OF THE INVENTION

The general object of the present invention is to provide, in an air compressor or supercharger, an internal drive mechanism which, as compared to prior internal drive mechanisms, generates less heat, operates with greater efficiency, requires less energy to operate and facilitates installation on the engine or other power source.

A more specific object is to provide an internal drive mechanism that utilizes a positive-drive cog belt and pre-lubricated bearings thereby eliminating the need for oil lubrication of the internal drive mechanism and making the supercharger virtually maintenance free.

Another object is to provide an internal drive mechanism that is relatively quiet in relation to normal engine noise.

Yet another object is to provide an internal drive mechanism that incorporates stabilizing components to reduce tension and stress on the belt.

The present invention relates generally to an improved supercharger or air compressor that advantageously incorporates an internal drive mechanism utilizing a pair of sprockets mounted on parallel input and output shafts respectively and drivingly connected by a taut, endless cog-belt trained around and engagingly running on the two sprockets. More importantly, the present invention relates to several stabilizing components which alone and together serve to stabilize the tension and stress in the belt, thus allowing the belt to be operated at speeds and under loads that otherwise would destroy the belt. One such stabilizing component is the means for evacuating air trapped between the belt and the output sprocket which, at high speeds, adds unnecessary tension to the belt and may even cause the belt to disengage from the output sprocket. Another such stabilizing component is a pair of springs nested against the respective input and output drive shafts to reduce unwanted vibration which may occur during acceleration or especially severe deceleration of the belt.

The input shaft is received within the inner races of pre-lubricated, sealed ball bearings having outer races anchored to the supercharger housing, and the output shaft is received within the inner races of double-shielded, pre-lubricated ceramic ball bearings having outer races anchored to the supercharger housing, thereby eliminating the need for oil lubrication. By eliminating oil lubrication, the drive mechanism is made virtually maintenance-free and generates and retains less heat during operation. The reduced heat means that the drive mechanism produces greater air-flow and consequent horsepower.

The cog-belt is a conventional endless belt containing longitudinal tensioning members such as KevlarJ or black fiberglass, and drives the impeller at speeds up to and exceeding approximately 40,000 revolutions per minute (RPM). At such speeds, belts can be expected to fail, but it was discovered that the ceramic bearings for the output shaft, the springs reducing vibration in the respective input and output shafts, and the air ducts incorporated into the output shaft each individually and in cooperation function as stabilizing components contributing to the operational life of the belt for virtually maintenance-free high-speed, operation.

In addition, an idler is incorporated into the internal drive mechanism to engage the belt. While conventional wisdom suggests that the idler should be placed to engage the portion of the belt returning from the drive or input shaft, the present invention incorporates the idler to engage the portion of the belt returning from the driven or output shaft. The idler stabilizes the belt during deceleration to prevent additional wear to the belt during rapid and uncontrolled deceleration that can occur under normal stop-and-go traffic conditions. With the idler in its unusual location, the output shaft functions as the drive shaft during deceleration when the idler is needed.

BRIEF DESCRIPTION OF THE DRAWINGS

Other objects and advantages of the invention will become apparent from the foregoing detailed description taken in connection with the accompanying drawings, in which FIG. 1 is a front perspective view of a supercharger including an internal drive mechanism embodying the novel features of the present invention;

FIG. 2 is an exploded perspective view of the supercharger;

FIG. 3 is a sectional view taken along the line 3—3 of FIG. 1;

FIG. 4 is an enlarged sectional view taken along the line 4—4 of FIG. 3;

DESCRIPTION OF THE PREFERRED EMBODIMENTS

Figures 5, 6:
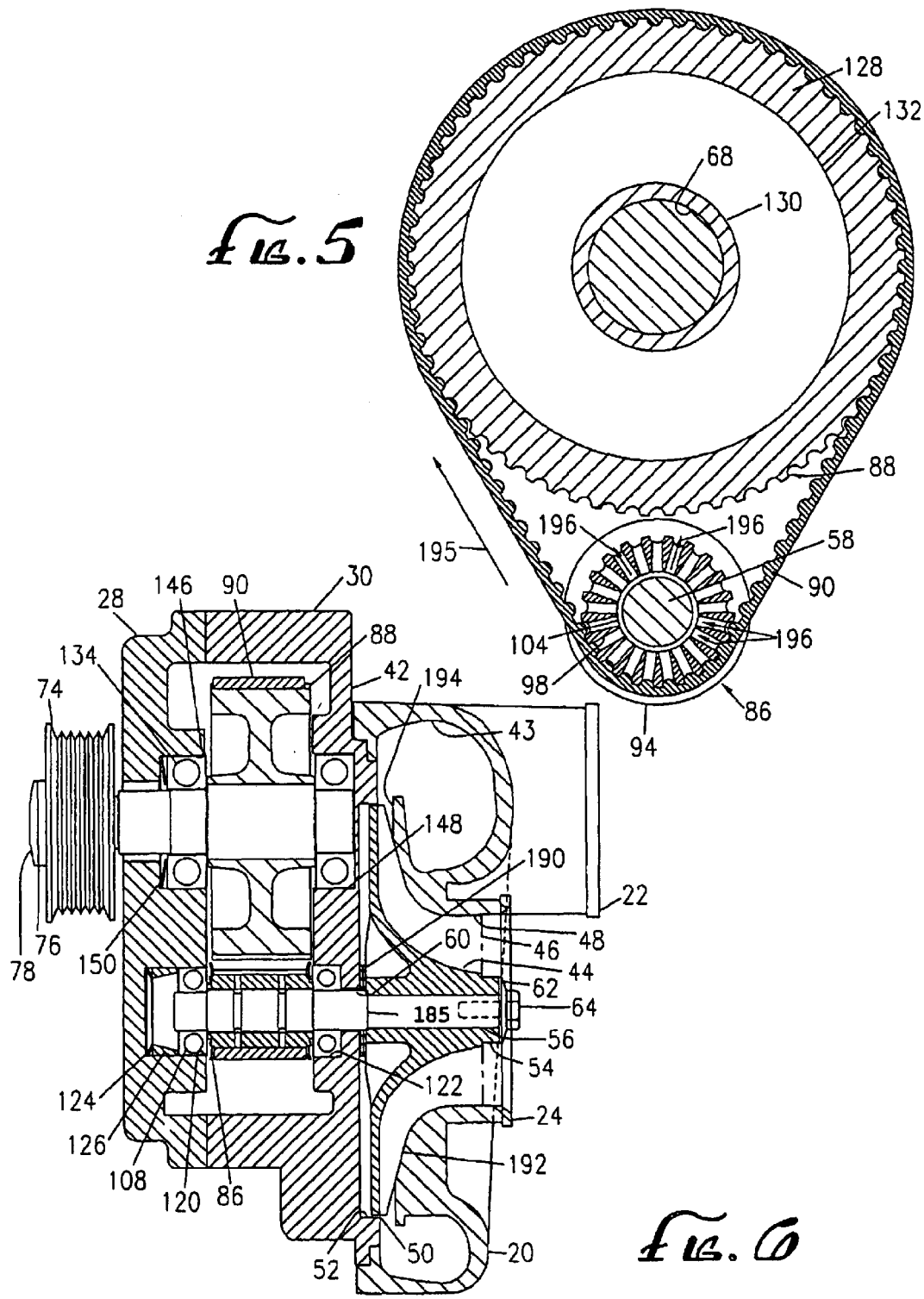
FIG. 5 is an enlarged sectional view of the internal drive mechanism of the preferred embodiment as shown in FIG. 3.
FIG. 6 is an enlarged sectional side view of the supercharger taken substantially along line 6—6 of FIG. 1.

As shown in the drawings for purposes of illustration, the invention is contained within a conventional supercharger or air compressor housing of the centrifugal type. The housing includes generally a special casing 20 known as the "scroll" 20 (FIGS. 1 and 2) having an air outlet 22 and an air inlet 24 (FIG. 6), a cover 26 configured with ribs 28 for strength and for cooling by virtue of the added surface area, and a case 30 (FIGS. 1 and 2) secured by bolts 32 and 34 respectively inserted through threaded bores 36 and 38 between the scroll 20 and the cover 26 respectively. The bolts 32 connecting scroll 20 and the case 30 include retainers 40 connecting between pairs of bolts for added structural support. The scroll 20, the case 30 and cover 26 are preferably made of 356-T6 industry grade cast aluminum.

Figure 7:
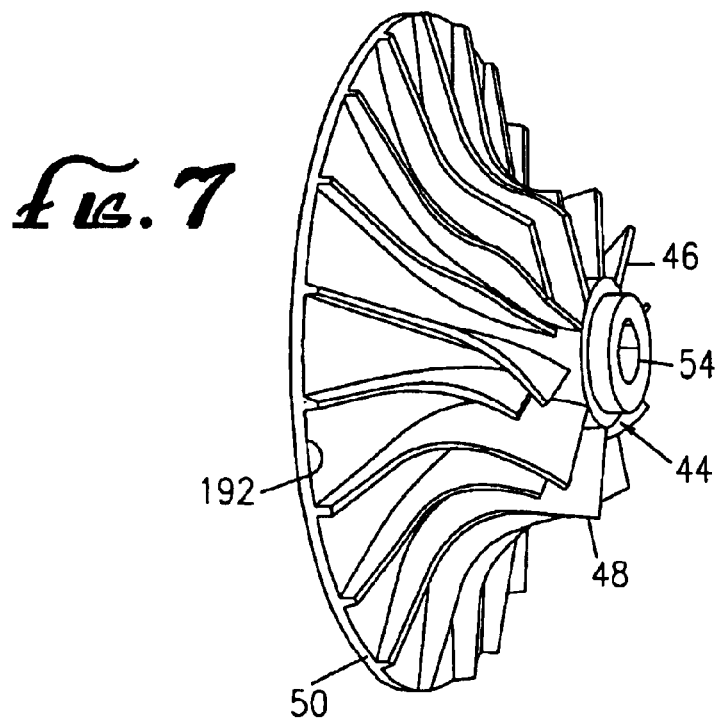
FIG. 7 is an enlarged perspective view of the impeller of the present invention.

The scroll 20 (FIG. 6) and inner wall 42 of the case 30 form a conventional type compression chamber 43 in which the impeller 44 includes a rotor 46 aligned coaxially within the cylindrically shaped air inlet 24 to draw air into the compression chamber 43 from the air inlet 24 through the gaps between the rotating blades 48. The impeller 44 (FIGS. 6 and 7) includes a base 50 rotatingly nested in a shallow bore 52 in the case wall and a generally triangularly-shaped, fixed hub 54 normal to the base 50 and received on a matching triangularly-shaped segment 56 of a steel output shaft 58 extending through a bore 60 coaxial with the shallow bore 52 in the case wall, and held thereon by a retainer 62 and screw 64. The generally triangularly-shaped shaft 56 and matching hub 54, although this shape is preferred, may be any conventional shape to prevent movement there between. The impeller is preferably made of 355-T6 industry grade high density cast aluminum.

For added structural support and precision alignment between the case 30 (FIG. 2) and the cover 26, alignment pegs 66 extend from the case and are received in matching holes (not shown) in the cover. A steel input shaft 68 (FIGS. 2 and 6), parallel to the output shaft 58, includes a segment 70 extending through a bore 72 in the cover and includes a slip-fit, key-fixed pulley 74 received on the input shaft 68, positioned adjacent to the cover, and held thereon by a retainer 76 and screw 78 connected coaxially with the drive shaft in a thread bore. The pulley 74 is grooved to receive a belt (not shown) drivingly connected to a pulley located on the drive shaft of an engine (not shown) to obtain a conventional 3-to-1 step-up ratio.

Advantageously, the internal drive mechanism (FIGS. 2 and 3) which primarily embodies the novel features of this invention is contained within the drive chamber 80 defined by the inner wall 42 of the case, the surrounding elongated portion 82 of a split level rim 84 formed about the perimeter of the case wall and the cover. The inner drive mechanism generally includes an output sprocket 86 and an input sprocket 88 mounted on the respective output and input shafts 58 and 68 and drivingly connected by a taut, endless cog belt 90 seated and running on the sprockets 86 and 88 with a tooth profile to match the tooth profile of the sprockets. The belt 90 may be made using Kevlar™ or preferably black fiberglass as the tensioning member to provide the minimal strength necessary for operation. The cog-tooth belt at a minimum must have an allowable tensile load requirement of approximately 150 lbs., an allowable stress requirement in tension generally greater than 37,000 psi in the belt minimum cross-section, and an allowable shear stress in a dynamic (vibratory) loading situation of a minimum of approximately 2400 psi at the tooth root, and operate within the temperature range of approximately −30° to +300° fahrenheit in order to drive the output sprocket at the preferable speed of approximately 40,000 RPM plus or minus 7,000 RPM. A belt suitable for this purpose, but not limited to, is manufactured by Gates Rubber Company under U.S. Pat. Nos. 4,233,852 and 4,337,056. It will be appreciated that as improvements are made to belt technology, these ranges may be increased. The diameters of the input and output sprockets 86 and 88 are predetermined to provide generally the desired additional 3-to-1 step-up ratio.

The output sprocket 86 (FIGS. 2 and 4) includes radially extended flanges 92 and 94 on opposite ends of the cylindrical sprocket inclined away from each other to form containments wherein the belt 90 engages the output sprocket. The output sprocket 86 includes a coaxial bore 96 forming a central hub and pairs of spaced apart, radial bores 98 and 100 extending from the gaps in the sprocket teeth to the coaxial bore 96 forming radial air vents. The sprocket hub is received on a wide diameter segment 102 of the output shaft 58. A pair of parallel, spaced apart channels 104 and 106 extend about the circumference of the output shaft 58 and align with the radial vent bores 98 and 100 to form a pair of radial air ducts constituting means for evacuating air through the sprocket vents between the sprocket gaps. As shown most clearly in FIG. 4, these air ducts comprise the vents 98 and 100 in the sprockets and the channels 104 and 106 of the shaft.

A pair of shielded, pre-lubricated, ceramic (Silicon-Nitride) ball bearings 108 and 110 include inner races 112 and 114 respectively received on the output shaft 58 at opposite ends of the output sprocket 86. The sealed bearings include outer races 116 and 118 received in opposing anchor bores 120 and 122 (FIG. 6) coaxial with the shaft 58 and bore 60 extending through the case wall into the compression chamber 43. A ceramic bearing typical of the type suitable for this purpose is manufactured by The Barden Corporation, Danbury, Conn. and sold under model number C202SST5. Nested between the cover 26 and the outer race 116 of the bearing within the anchor bore 120 is a disk-shaped finger spring 124 and a spacer 126 engaging the spring 124 and the bearing outer race 116. The finger spring 124 and spacer combine to form a bearing-loading shock absorber.

The input sprocket 88 (FIGS. 2 and 6) made preferably of solid 6061-T6 industry grade aluminum includes an outer sprocket rim 128 connected to a central hub 130 by a centrally-located, radial disk 132 extending therebetween to minimize weight. The input sprocket 88 is preferably coated with a wear, corrosion and temperature reducing coating such as Magna Coating™ sold by Gates Rubber Co., Denver, Colo. The input sprocket hub 130 is received on the input shaft 68 and a pair of sealed, pre-lubricated steel bearings 134 and 136 having inner races 138 and 140 respectively received on the shaft 68 are positioned along the shaft proximate to respective sides of the sprocket 88. The sealed bearings 134 and 136 include outer races 142 and 144 received in opposing anchor sleeves 146 and 148 coaxial to the shaft 68 and bore 72 extending through the cover wall to the pulley 74. A steel bearing typically of the type suitable for this purpose is manufactured by American Koyo Corp., Cleveland, Ohio and sold under model number 6205ZZCMP5GK7. Nested between the cover and the outer race of the bearing in the input cover sleeve is a disk-shaped finger spring 150.

The presently preferred embodiment additionally includes an idler 152 (FIGS. 2 and 3) having a central axis 154 normal to the sides 156 and 158 of the belt and uniquely seated against the outer surface 160 of the belt along the load transfer side of the belt drive. The idler 152 includes a pulley 162 having a hub 164 received on the outer races 166 and 168 of respective steel ball bearings positioned at opposite ends of the pulley 162. The inner races 174 and 176 of the ball bearings 170 and 172 are received on a fixed shaft 178 threadedly fixed at a threaded end 180 in a threaded bore (not shown) in the case wall. A conventional fastener, such as a retaining ring 182, may be used to secure the idler assembly on the shaft 178 at a free end. A partial sleeve 184 formed in the case rim allows for unobstructed rotation of the idler pulley 162.

Another novel aspect of the present invention is the use of disk-shaped shims 190 (FIG. 6) within the compression chamber 43 between the impeller base 50 and a shoulder 185 of the output shaft 58 having a generally triangularly-shaped, central bore (not shown) received on the output shaft segment 56 and against the shoulder 185 for rotation of the shims with the output shaft in spaced apart relation to the case wall. The shims generally range in thickness from $2/1,000$ to $30/1,000$ of an inch and cooperate with the impeller blades to obtain an impeller clearance with the inner surface of the scroll. The shims allow alignment of the blade edges 48 of the impeller 44 to achieve as closely as possible an impeller clearance within the general range of $7/1,000$ to $13/1,000$ of inch thereby increasing efficiency.

In operation, the supercharger is preferably mounted onto the engine, the air output is connected to the combustion chamber of the engine, and the grooved, outer pulley is drivingly connected to the engine shaft by a belt (not shown). The outer pulley 74 (FIGS. 1 and 2) is configured to run at a speed three times faster than the engine drive shaft. The input shaft sprocket 88 (FIGS. 2 and 3) responsive to the rotation of the outer pulley 74 also runs at a speed equivalent to three times the engine shaft. The output sprocket 86 drivingly connected to the input sprocket 88 by the belt 90 is driven to speeds three times greater than the input sprocket 88, nine times greater than the drive shaft, at speeds of around 40,000 rpm or more.

At such speeds, changes in the tension of the belt 90 can cause unwanted vibration in the input and output shafts 68 and 58. This vibration is minimized by the pre-load and shock absorbing finger springs 150 and 124 (FIGS. 2 and 6) nested in the anchor bores 120 and 122 respectively. The belt seated on the output sprocket 86 (FIGS. 4 and 5) between the flanges 92 and 94 can trap air between the interlocking teeth of the belt 92 and sprocket 86 when operated at such speeds, so the trapped air can add additional tension to the belt 90 and may even cause the belt 90 to improperly align or disengage. As the belt 90 drives the output sprocket 86 in the direction indicated by the arrow 195, air trapped in the gaps between the sprocket teeth and the belt is evacuated through the air ducts and out the unobstructed portions of the output sprocket 86, as indicated by the arrows 196 in FIG. 5. Apertures cut into the flanges (not shown) may also provide the air evacuation means to evacuate the trapped air. In addition, the ceramic ball bearings are preferably rated at speeds up to 62,000–70,000 RPM to maintain low friction and low heat rotation of the output shaft. By minimizing the heat on the output shaft, the efficiency of the air compressor is increased and greater horsepower is achieved in the engine. During acceleration, the loads applied to the belt are controlled due to the steadily increasing torque from the engine; however, during deceleration loading is generated by the uncontrolled and chaotic centrifugal forces of the impeller and engine. The idler functions to support the belt during deceleration when the loads applied to the belt are uncontrolled. All of these improvements including tensioning members formed within the belt, alone and in combination, function as stabling components or stabilizing means.

Figure 8:
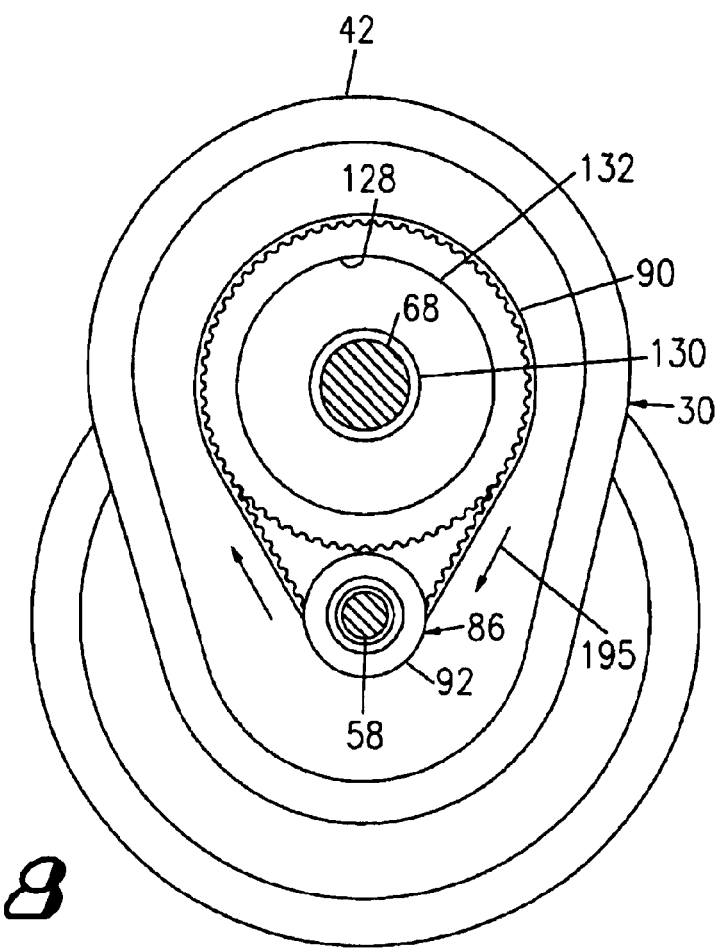
FIG. 8 is an enlarged sectional view similar to FIG. 3 but showing an alternative embodiment of the internal drive mechanism of the present invention.

An alternatively preferred embodiment (FIG. 8) eliminates the idler where the internal drive mechanism is used with engines other than for vehicles, in which sudden deceleration is not experienced. In this embodiment, which differs from the first embodiment only in the omission of parts, corresponding elements are indicated by corresponding primed reference numbers and are not otherwise described in detail.

Air compressors driven by any steady state power source, such as an electric motor, where sudden deceleration is not experienced, do not require an idler, but are shown with the other stabilizing components. These internal drives provide additional step-up between the rotation of the impeller and the power source thereby increasing efficiency and output power.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A centrifugal air compressor having an internal drive mechanism adapted as a supercharger for an internal combustion engine of a vehicle comprising:
- an impeller;
- input and output shafts;
- input and output sprockets mounted, respectively, on said input and output shafts;
- a drive chamber adapted to receive said input and output shafts;
- said input and output shafts rotatably mounted in said drive chamber;
- an endless drive belt trained around and drivingly connected to said input and output sprockets;
- the endless belt having at least one fiberglass tensioning member adapted to provide minimum strength necessary for operation;
- said input and output sprockets and said belt being enclosed within said drive chamber;
- a compression chamber adapted to receive said output shaft;
- said output shaft being received within said compression chamber;
- said impeller being integral with said output shaft within said compression chamber.

* * * * *